(12) United States Patent
Baals et al.

(10) Patent No.: US 6,813,347 B2
(45) Date of Patent: Nov. 2, 2004

(54) SELECTIVE CALL WAITING (75) Inventors: Kimberly A. Baals, Woodinville, WA (US); Darren A. Kall, Woodinville, WA (US)

(73) Assignee: Lucent Technologies Inc., Murray Hills, NJ (US)

( * ) Notice: Subject to any disclaimer, the term of this patent is extended or adjusted under 35 U.S.C. 154(b) by 484 days.

(21) Appl. No.: 09/828,985

(22) Filed: Apr. 10, 2001

(65) Prior Publication Data

US 2002/0146107 A1 Oct. 10, 2002

(51) Int. Cl.[7] .............................. H04M 3/20; H04M 3/42
(52) U.S. Cl. .............................. 379/215.01; 379/207.11; 379/903; 379/196; 379/197; 379/198
(58) Field of Search ....................... 379/201.01, 201.02, 379/207.02, 207.11, 208.01, 215.01, 903, 196, 197, 198

(56) References Cited

U.S. PATENT DOCUMENTS

| | | | | |
|---|---|---|---|---|
| 3,917,910 A | * | 11/1975 | Nielson | 379/205.01 |
| 5,636,269 A | | 6/1997 | Eisdorfer | 379/215.01 |
| 6,208,726 B1 | * | 3/2001 | Bansal et al. | 379/208.01 |
| 6,310,946 B1 | * | 10/2001 | Bauer et al. | 379/208.01 |
| 6,415,026 B1 | * | 7/2002 | Flood | 379/215.01 |
| 6,418,216 B1 | * | 7/2002 | Harrison et al. | 379/208.01 |

* cited by examiner

*Primary Examiner*—Harry S. Hong (57) ABSTRACT

A method and system of processing a call from a calling party to a called party are provided to enable selective call waiting which involves determining whether the called party is busy on another call; receiving a password from the calling party; and providing a call waiting signal to the called party only if the password corresponds to at least one predefined password associated with the called party.

26 Claims, 9 Drawing Sheets

SELECTIVE CALL WAITING

BACKGROUND OF THE INVENTION

1. Technical Field

The present invention is generally related to a call waiting service and, more particularly, to a system and method of selectively providing a call waiting signal through the use of a password or access code.

2. Art Background

Call waiting is a widely-used service that is provided by telephone companies to their subscribers. Call waiting enables a called party busy on another call to be notified, via a distinctive tone, of an incoming call and, if desired, to place the ongoing call on hold and connect with the incoming call by pressing the switch hook. Thereafter, the subscriber may once again press the switch hook to reconnect to the party that had been placed on hold. Although conventional call waiting service is a useful feature, many subscribers are annoyed at hearing the call waiting tone while busy on another call, particularly when the incoming call is discovered to be a unwanted call.

To address these issues, a variety of call waiting features are now available. For example, subscribers are offered the ability to turn on/off their call waiting service. However, this leaves open the opportunity of missing important calls, and does not resolve the problem of receiving call waiting signals associated with unwanted calls.

Caller identification (ID) systems now allow a called party to screen incoming calls. However, caller ID systems merely identify the location of the incoming call and, thus, are not particularly useful where a calling party is calling from an unidentified location (e.g., a public pay phone). Unless a calling party is calling from a known location, the called party is unable to ascertain the identity of the calling party or the importance of the incoming call. Also, caller ID systems do not resolve the problem of receiving call waiting signals associated with unwanted calls.

Thus, while subscribers of call waiting are now provided with more options and features, they still have little control over the receipt of a call waiting signal when busy on another call.

SUMMARY OF THE INVENTION

A method and system of processing a call from a calling party to a called party are provided to enable selective call waiting which involves determining whether the called party is busy on another call; receiving a password from the calling party; and providing a call waiting signal to the called party only if the password corresponds to at least one predefined password associated with the called party. The password can be defined by the called party or service provider, and maintained on a password list or the like.

The above selective call waiting process is preferably implemented by a intra-switch associated with the called party, but may also be implemented at other locations in a communications network, such as at inter-switches, a central office (CO), private branch exchange (PBX), a call station (e.g., telephone, computer, etc.) of a called party, a server connected to the network, a server manager accessible by a thin host, and so forth. Furthermore, the selective call waiting process may be implemented on or across a variety of networks, such as a public switched network, a local switched network, internet protocol (IP) network, converged voice and data network and so forth.

In accordance with another embodiment, a call station is configured to inhibit notification of an incoming call to the called party; to transmit to a calling party of the incoming call a signal simulating that the called party is busy on another call; to receive a password from the calling party; and to notify the called party of the incoming call if the password corresponds to at least one predefined password associated with the called party. This process may also be implemented in other locations, such as at a intra/inter-switch, a central office (CO), private branch exchange (PBX), a server connected to the network, a server manager accessible by a thin host, and so forth.

Other and further aspects of the present invention will become apparent during the course of the following description and by reference to the attached drawings.

DETAILED DESCRIPTION OF THE PREFERRED EMBODIMENTS

Figure 1:
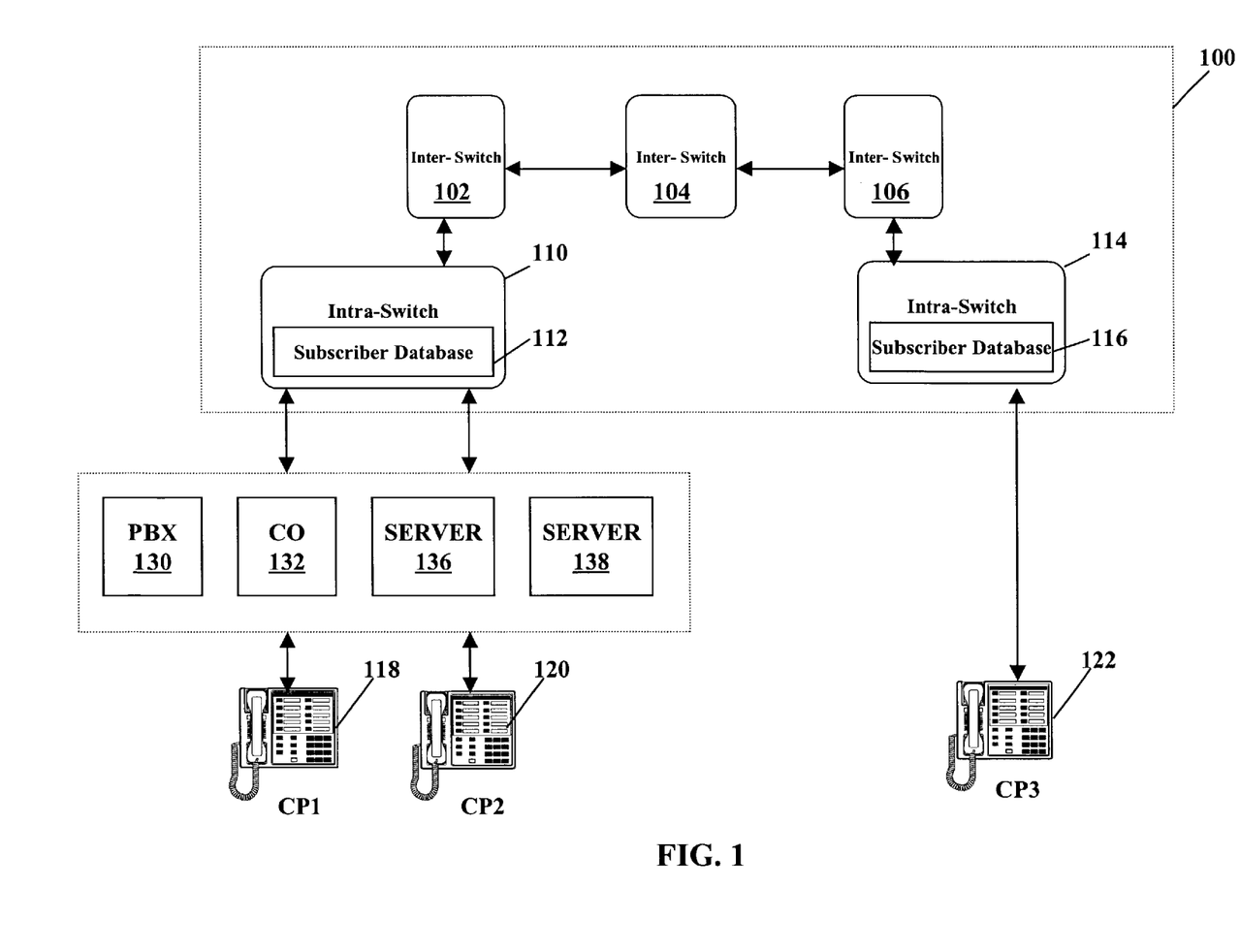
FIG. 1 shows a simplified overview of a communications network including call stations connected across a network having intra-node switches and inter-node switches for implementing selective call waiting.

Referring now to the drawings wherein like reference numbers refer to like parts, FIG. 1 shows a simplified overview of a communications network 100 connected between a plurality of call stations 118, 120 and 122 associated with parties CP1, CP2 and CP3. Communications network 100 includes a plurality of switches 102, 104, 106, 110 and 114 connected across any various communication lines or mediums, e.g., land-based and/or wireless. Call stations 118, 120 and 122 may be connected directly to corresponding intra-switches 110, 114 or connected to their associated intra-switches across other devices, such as a private branch exchange (PBX) 130, central office (CO) 132, a server 136 connected to the network 100 and so forth. Call stations 118, 120, 122 may take the form of a telephone, a mobile telephone, a computer or any communication device. Call stations 118, 120, 122 may be programmed or configured to inhibit notification (e.g., audio, visual, mechanical, etc.) of an incoming call to a called party based, for example, on a user command or predefined setting by a user.

Switches 102, 104, 106 are generally referred herein as inter-switches that are connected between other network switches in communications network 100. Switches 110, 114 are generally referred herein as intra-switches that connect call stations 118, 120, 122, such as a telephone, computer system and so forth, to the network 100.

Switches 102, 104, 106, 110 and 114 can be any one of the well known types of switching equipment, such as No. 5 Electronic Switching System (5ESS) that is available from Lucent Technologies, Inc.

Subscriber databases 112, 116 are preferably maintained locally at respective switches 110, 114 and store information associated with call waiting subscribers on their service list. For example, subscriber database 112 would maintain information associated with the parties CP1 and CP2. This information may include, for example, subscriber identifiers (e.g., a phone number) and passwords or access codes (hereinafter "passwords") associated therewith. While switches 110, 114 preferably maintain subscriber databases 112, 116 associated with subscribers on their service list, the subscriber information stored in these databases may instead be stored at any location accessible by switches 110, 114, for example, at a central location accessible by the switches.

In accordance with one embodiment, intra-switches 110, 114 are configured to receive a request from a calling party to connect with a called party, to determine whether the called party is busy on another or an ongoing call, to receive a password from the calling party, and to provide or cause the provision of a call waiting signal to the called party if the called party is busy and the password from the calling party corresponds to at least one predefined or preselected password associated with the called party. The password can be defined by the called party or service provider, and maintained on a password list or the like.

Such an arrangement provides a called party with control over the receipt of call waiting signals. That is, the called party may selectively provide an associated password to parties that he or she believes to be important enough to interrupt an ongoing call. In this way, the called party, if busy on another call, will only be notified of an important incoming, e.g., a call from a party with the password. Unlike caller ID systems, the selective call waiting approach also allows a calling party to call from any location. Selective call waiting may work in conjunction with caller ID as well as other subscriber services.

In addition to those benefits to the subscribers, the selective call waiting feature may also be easily integrated into communication systems, networks and equipment with minimal work and costs.

While the selective call waiting process is preferably implemented by the intra-switches 110, 114 as described above, this process may also be implemented in other locations, such as at a inter-switch, a central office (CO), private branch exchange (PBX), a call station (e.g., telephone, computer, etc.) of a called party, a server connected to the network, a server manager accessible by a thin host, and so forth. Furthermore, the selective call waiting process may be implemented on a variety of networks, such as a public switched network, a local switched network, internet protocol (IP) network, converged voice and data network and so forth.

In accordance with another embodiment, a call station is configured to inhibit notification of an incoming call to the called party; to transmit to a calling party of the incoming call a signal simulating that the called party is busy on another call; to receive a password from the calling party; and to notify the called party of the incoming call if the password corresponds to at least one predefined password associated with the called party. This process may also be implemented in other locations, such as at a intra/inter-switch, a central office (CO), private branch exchange (PBX), a server connected to the network, a server manager accessible by a thin host, and so forth.

Figure 2:
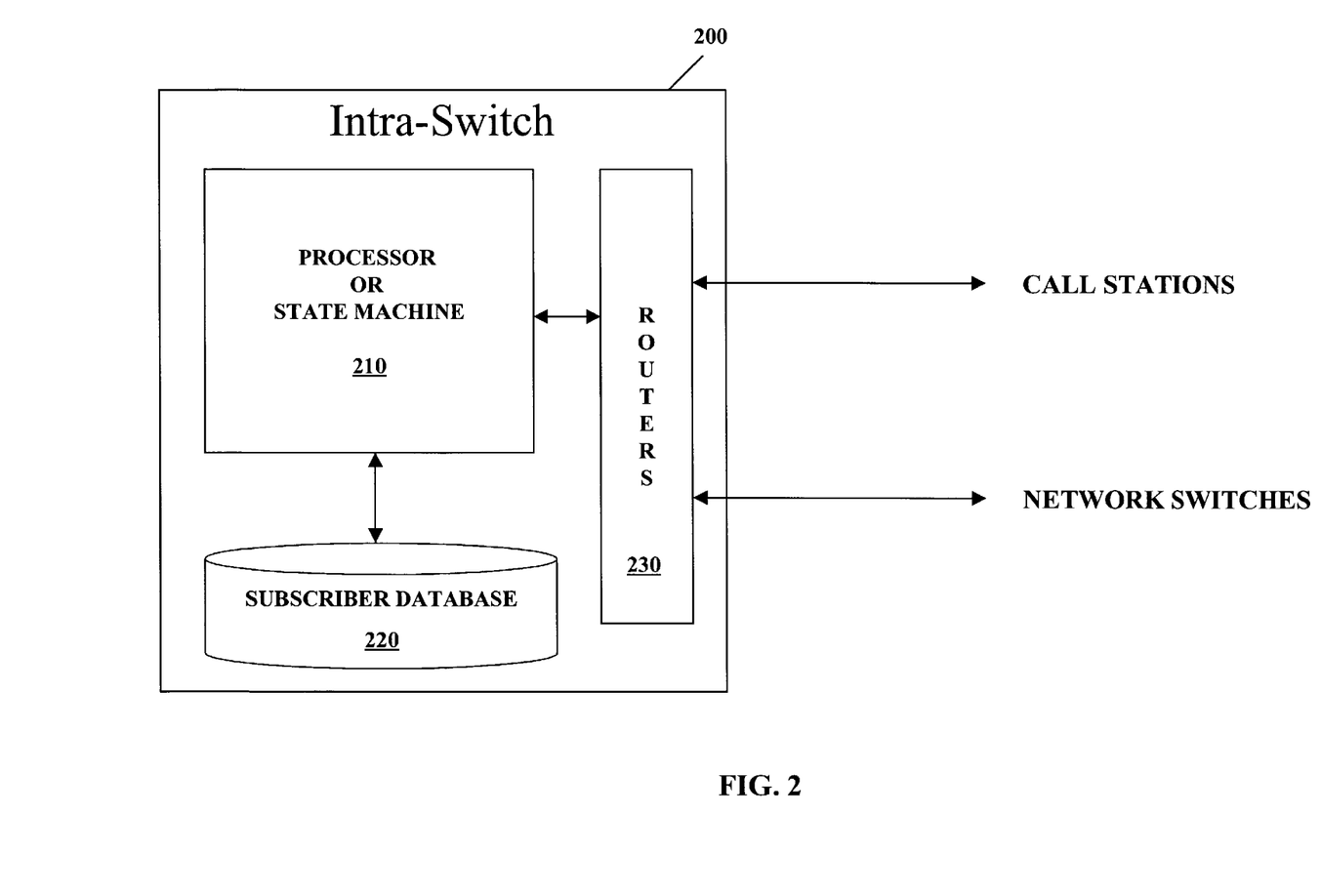
FIG. 2 is a schematic block diagram illustrating a switch configured to implement selective call waiting.

FIG. 2 is a schematic block diagram illustrating a switch 200 configured to implement selective call waiting. Switch 200 includes conventional switch components, such as a processing system, state machine or controller 210 (hereinafter "processing system") which control switch functions and routers 230. Processing system 210 is configured to perform conventional switching operations as wells as the selective call waiting process described below with reference to FIG. 4. Routers 230 enable information to be routed from switch 200 to call stations and other network switches. Switch 200 preferably maintains locally a subscriber database 220 for storing subscriber information, such as subscriber list identifying which parties subscribe to the selective call waiting service and their associated passwords.

Switch 200 can be an intra-switch, inter-switch or any switch involved in the performance of communications between a calling party and a called party.

Figure 3:
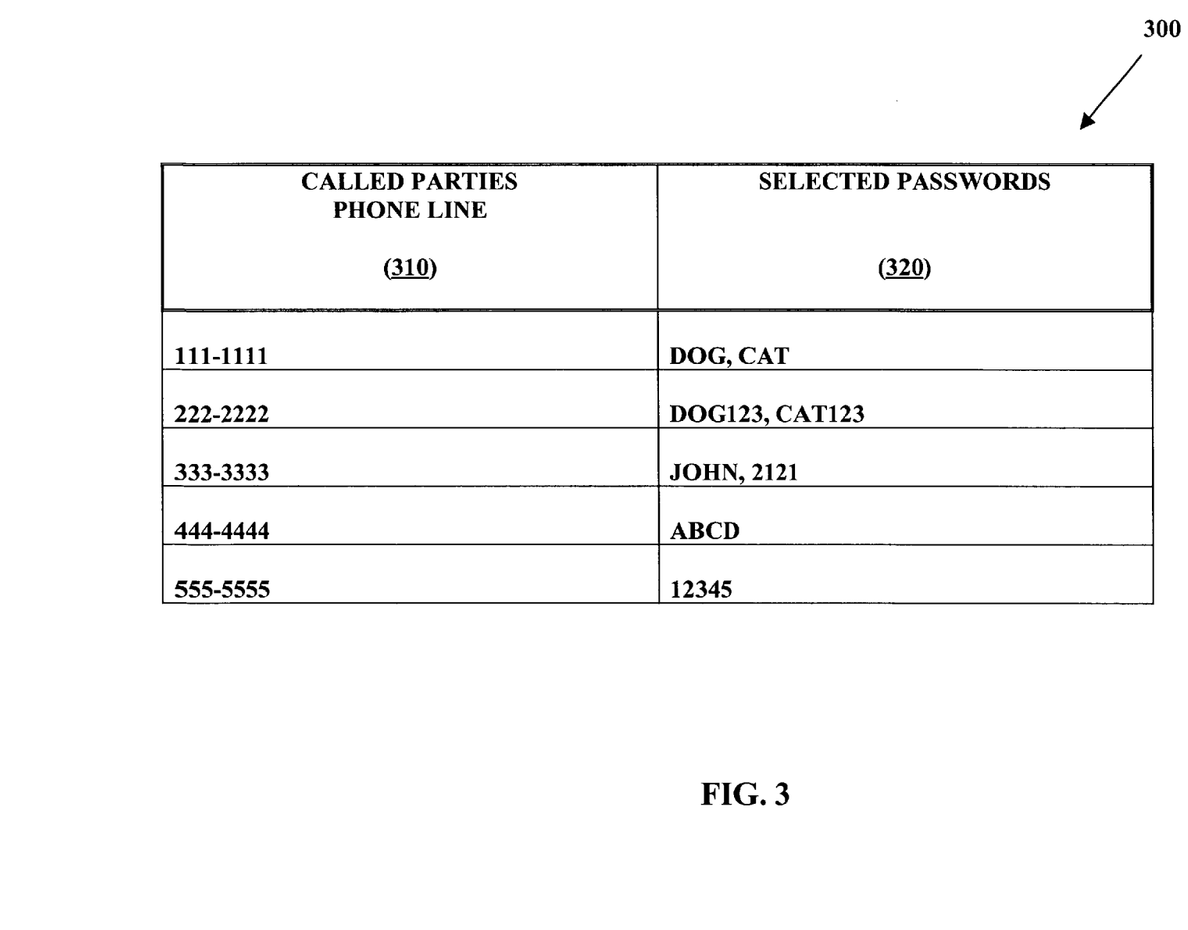
FIG. 3 illustrates a subscriber database for implementing selective call waiting.

FIG. 3 illustrates an example of subscriber database 220 of FIG. 2. Subscriber database 220 preferably stores a subscriber identifier field 310 and a password field 320. Subscriber identifier field 310 identifies the phone lines subscribing to selective call waiting, for example, by their associated phone numbers. Password field 320 identifies any passwords associated with each selective call waiting subscriber. The password may be a number, word, alphanumerical combination, etc. For example, a calling party may enable a call waiting signal to be transmitted to a called party, associated with the identifier 111-1111 and busy on an ongoing call, by transmitting either the password DOG or CAT to the network 100. The password may be provided by the calling party in a variety of ways, such as typed, spoken or any format or manner that can be detected and identified for use in authentication.

Figure 4A:
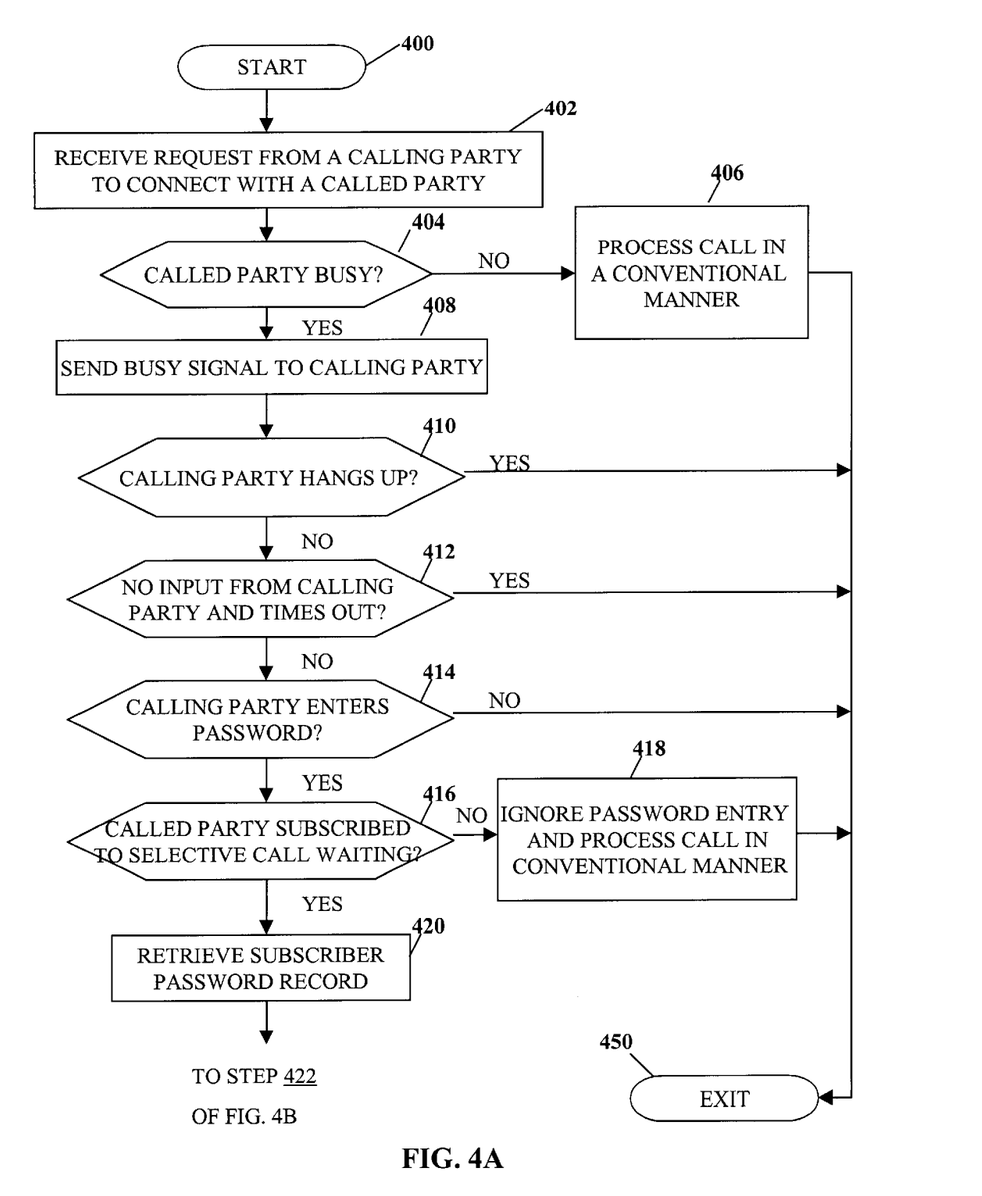
FIGS. 4A and 4B is a flowchart illustrating an exemplary process by which a switch in the network of FIG. 1 implements selective call waiting.
Figure 4B:
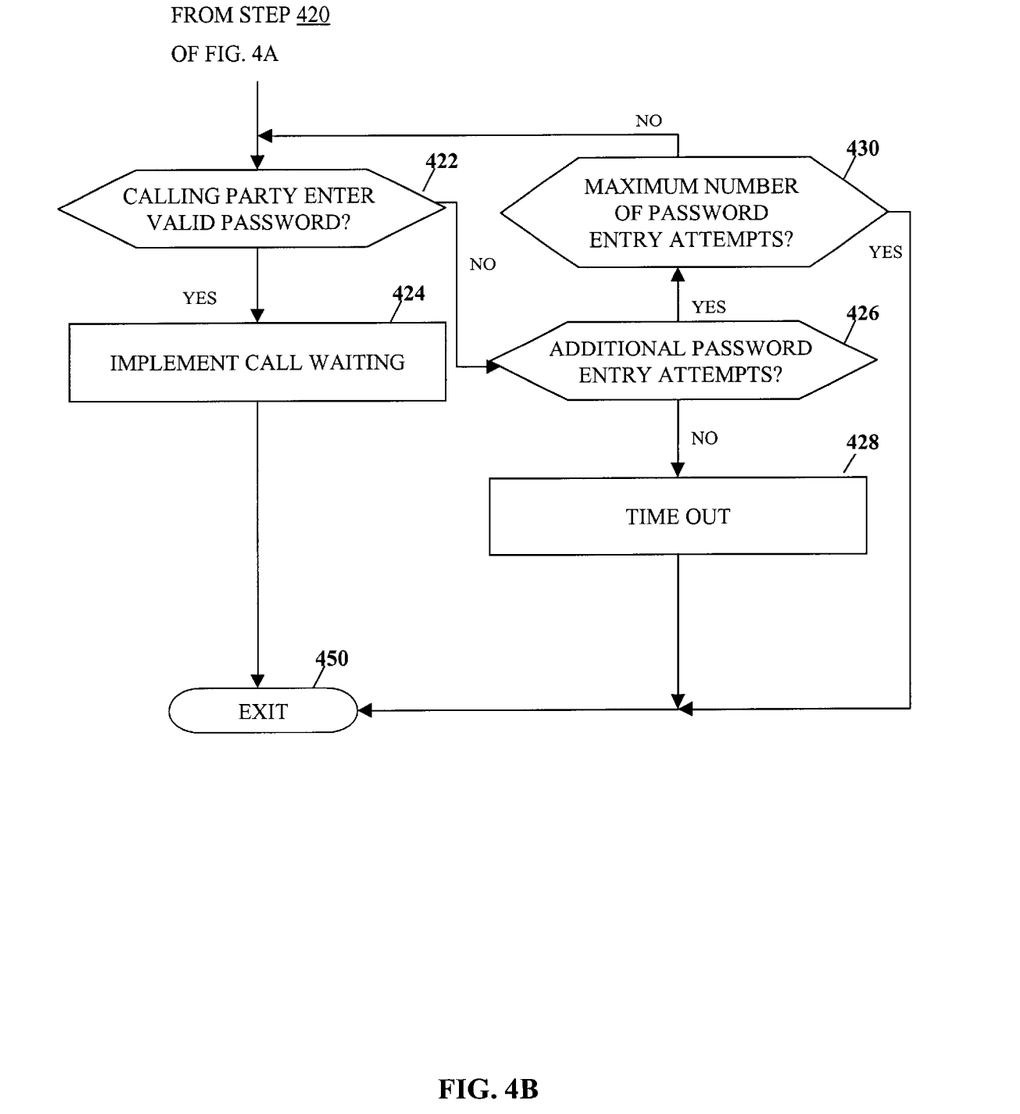

FIGS. 4A and 4B are flowcharts illustrating an exemplary process by which a switch may implement selective call waiting. An example of the selective call waiting process will be described below with reference to the communications system shown in FIG. 1 in which a call is placed from calling party CP3 at call station 122 to the called party CP1 at call station 118.

Switch 110 initiates the process at block 400 upon receipt of a request from the calling party CP3 to connect with the called party CP1, at block 402. Switch 110 determines whether the called party is busy at block 404. If the called party CP1 is not busy, the call is processed in a conventional manner at block 406 and the process is terminated at block 450. Otherwise, if the called party CP1 is busy, switch 110 transmits or facilities the transmission of a busy signal to the calling party CP3 at block 408.

At block 410, switch 110 determines whether the calling party has terminated the call, e.g., calling party CP3 hanging up. If the calling party CP3 has terminated the call, the process is terminated at block 450. Otherwise, switch 110 determines whether the calling party CP3 has provided any input within a predetermined period at block 412 or the calling party CP3 has timed out.

If the calling party CP3 has not provided any input with the predetermined period, the process is terminated at block 450. Otherwise, switch 110 determines whether the calling party has entered a password at block 414. If the calling party has not entered a password, the process is terminated at block 450. If a password has been entered by the calling party CP3, switch 110 determines whether the called party CP1 is a subscriber of selective call waiting at block 416.

If the called party CP1 is not a subscriber of selective call waiting, the password entry is ignored and the call is processed in a conventional manner at block 418 with the process terminating at block 450. If the called party CP1 is a subscriber, switch 110 retrieves a subscriber password record at block 420. Switch 110 then determines whether the calling party CP3 entered a valid password at block 422. As discussed above, the calling party CP3 may input the valid password in any detectable and/or identifiable format, e.g., typed, spoken, etc.

Various voice recognition technologies may be employed as part of the authentication process relating to the password (e.g., access code). For example, the calling party can say the password and the system can either identify the speaker, the password or both. A voice sample of the calling party CP3 may be recorded and maintained or accessible to switch 110 for use in performing voice recognition comparisons.

If the password submitted by the calling party CP3 is valid, switch 110 implements or facilitates the implementation of call waiting to notify the called party of another incoming call at block 424

If the password is not valid, switch 110 checks for additional password entry attempts at block 426. If no additional password entries are made by the calling party CP3 within a predetermined period, then the communication is considered to be timed out at block 428, and the process is terminated at block 450. Otherwise, switch 110 determines whether a maximum or threshold number of attempts have been made by the calling party CP3 at block 430. If so, the process is terminated at block 450. Otherwise, the process proceeds to block 422 to check whether the additional password entr(ies) are valid, and so forth.

While the above describes an example of the selective call waiting process implemented at a intra-switch, this process may be implemented at other locations, such as at an inter-switch, a CO, a PBX, a call station of the called party, a server connected to the network, a server manager accessible by a thin host, or any network component or device involved in establishing or enabling communications between a calling party and a called party.

Figure 5:
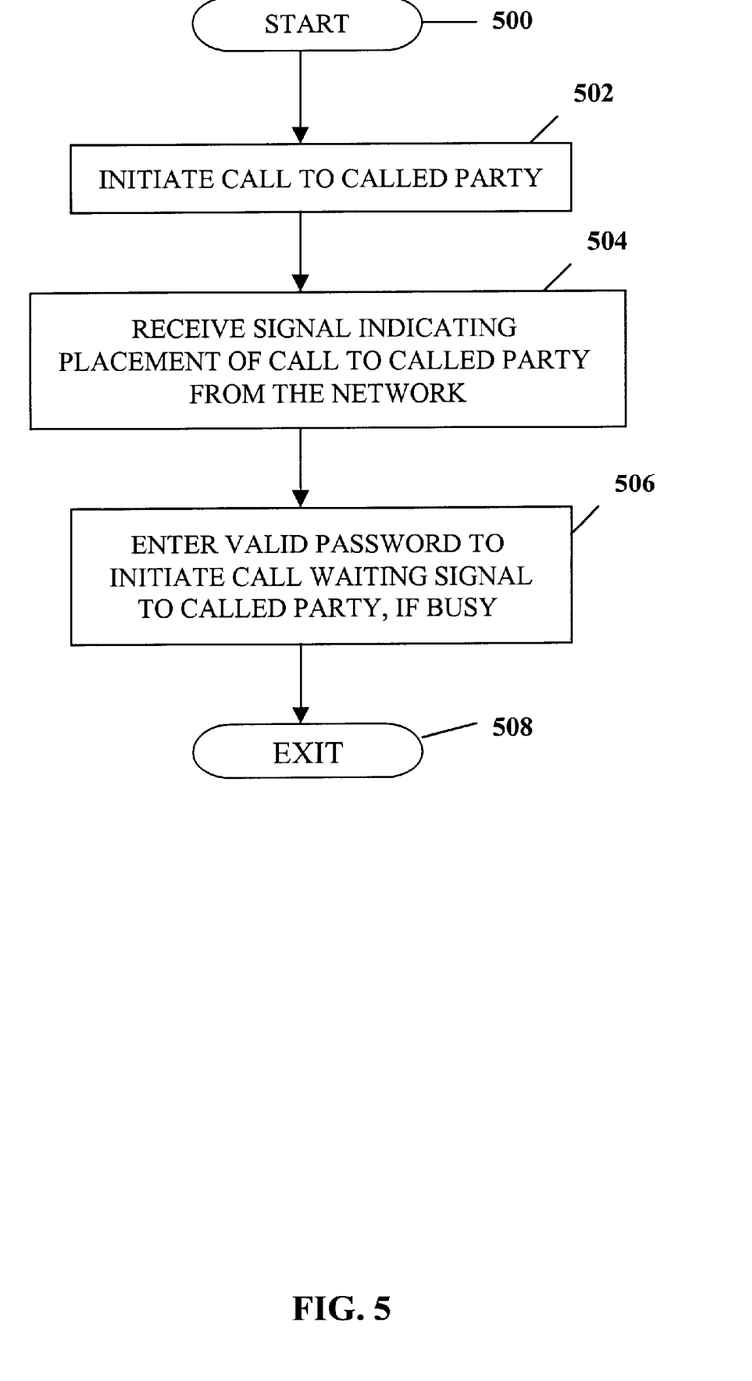
FIG. 5 is a flowchart illustrating an exemplary process by which a calling party initiates the selective call waiting feature.

FIG. 5 is a flowchart illustrating an exemplary process by which a calling party initiates the selective call waiting feature. This process will be described below with reference to the communications system shown in FIG. 1 in which a call is placed from calling party CP3 at call station 122 to called party CP1 at call station 118.

The processes begins at block 500 where a call is initiated from the calling party CP3 to the called party CP1 at block 502 by, for example, dialing automatically or manually a telephone number associated with the called party CP1. At block 504, the calling party CP3 receives from the network a signal (e.g., ringing signal) indicating placement of the call to the called party. Thereafter, the calling party CP3, via call station 122, transmits a valid password associated with the called party CP1 to enable or initiate the call waiting service of the called party CP1 for the current call if the called party CP1 is busy on another call or on ongoing call at block 506. The process is exited at block 508.

Figure 6:
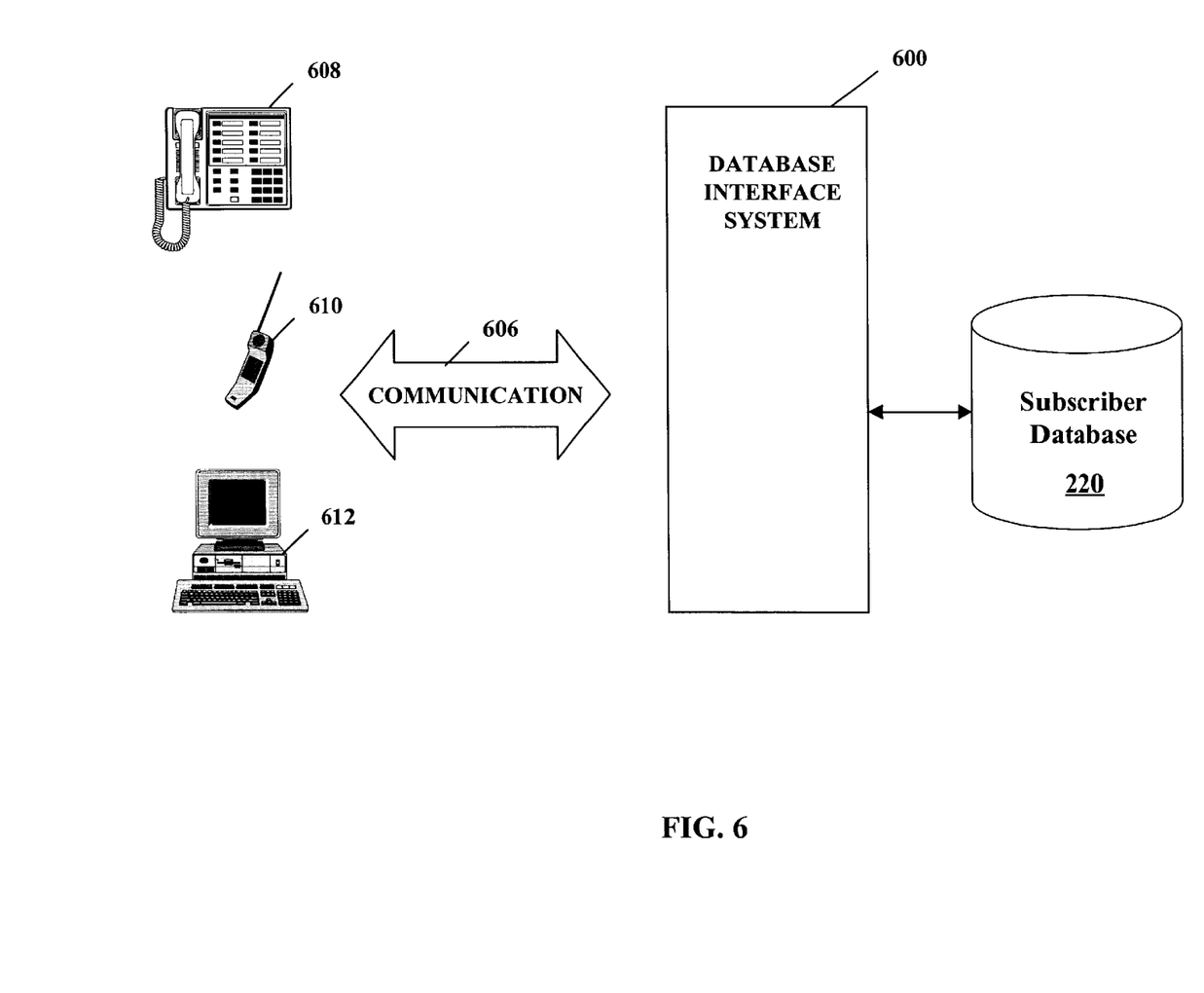
FIG. 6 is a schematic block diagram illustrating a system for accessing and modifying subscriber information, such as a password, associated with the implementation of selective call waiting.

FIG. 6 is a schematic block diagram illustrating a system for accessing and modifying subscriber information, such as a password, associated with the implementation of selective call waiting. The system includes a database interface system 600 configured to enable modification of subscriber information maintained in subscriber database 220. Database interface system 600 may be accessed over known communication mediums by a subscriber of selective call waiting through a telephone 608, a mobile telephone 610, a computer 612 and so forth.

Database interface system 600 may take the form of a conventional voice processing system configured to provide user friendly voice menus to enable access and update through a telephone, or conventional data processing systems capable of providing user friendly graphical interface menus to enable access and update through a computer, or a combination thereof. Database interface system 600 is configured to perform the password modification process described below with reference to FIG. 7.

Figure 7:
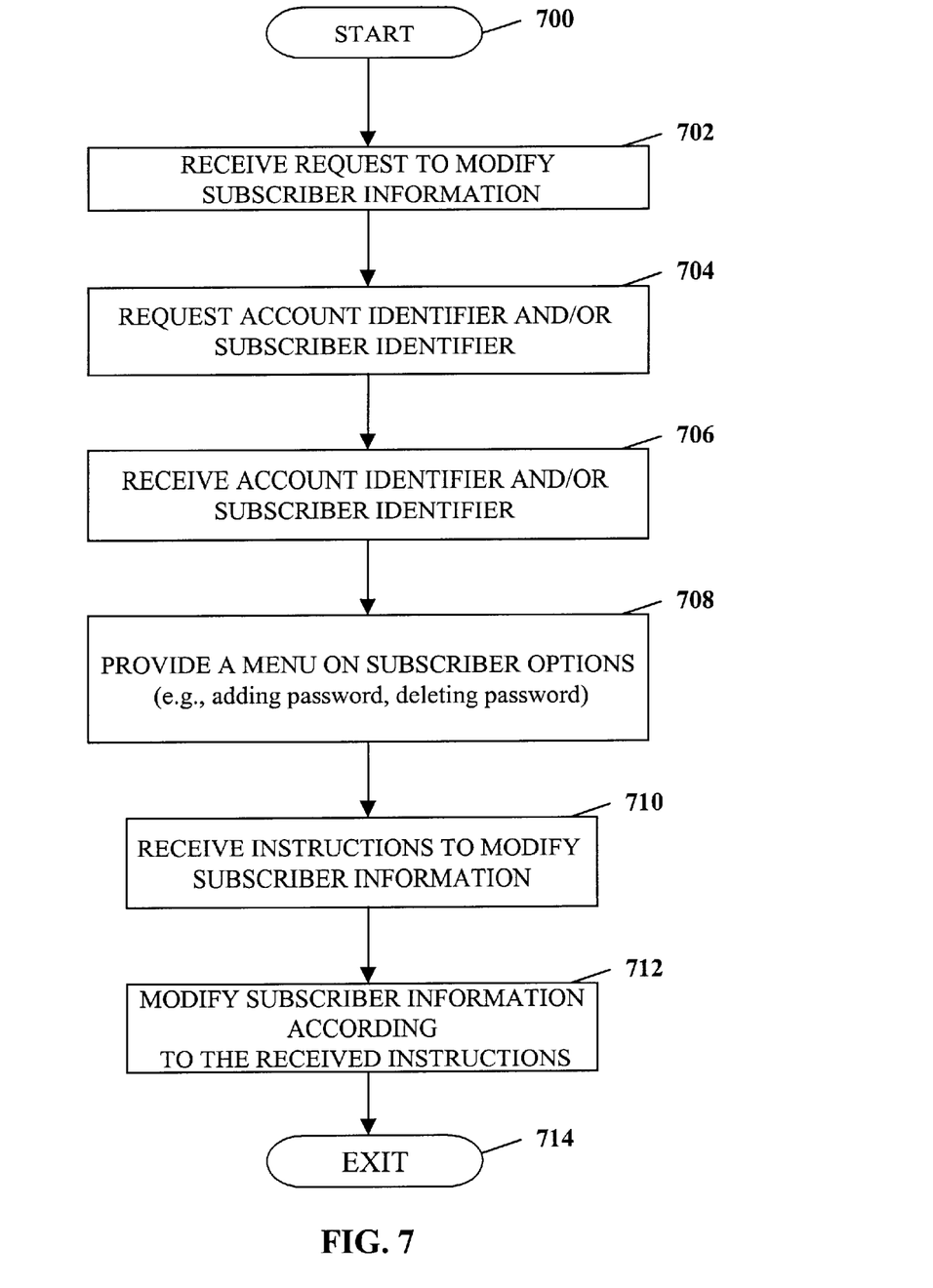
FIG. 7 is a flowchart illustrating an exemplary process by which the system of FIG. 6 enables access and modification of subscriber information maintained in a subscriber database associated with the implementation of selective call waiting.

FIG. 7 is a flowchart illustrating an exemplary process by which database interface system 600 of FIG. 6 enables access and modification of subscriber information maintained in a subscriber database associated with the implementation of selective call waiting. The process begins at block 700. Database interface system 600 receives a request via a subscriber access device, for example, telephone 608, to communicate with database interface system 600 at block 702. A communication connection is thereafter established between the database interface system 600 and the telephone 608. Database interface system 600 then requests an account identifier (e.g., a phone number—111-1111) and/or subscriber identifier (e.g., account authentication code) at block 704 and receives the account identifier and subscriber identifier at block 706.

Thereafter, database interface system 600 provides a menu of the subscriber's options which may include the addition or deletion of a password associated with the subscriber identifier at block 708. For example, database interface system 600 may transmit to telephone 608 the following voice message that says "Press 1 to add a password and press 2 to delete a password." Database interface system 600 then receives instructions via telephone 608 to implement the desired modification of the subscriber information at block 710. At block 712, database interface system 600 accesses subscriber database 220 and modifies the subscriber information (e.g., adds or deletes passwords) according to the received instructions. The modification process is terminated at block 714.

While the above describes an example of accessing database interface system 600 via a telephone, other devices may also be utilized to access database interface system 600. For example, a subscriber may access and interact with database interface system 600 via computer 612 by direct dialing or via the Internet. Instead of voice messages, a graphical user interface may be provided with a menu to enable modification of subscriber information. Alternatively, the subscriber may contact an operator who will access database interface system 600 and update the subscriber's information as desired.

Figure 8:
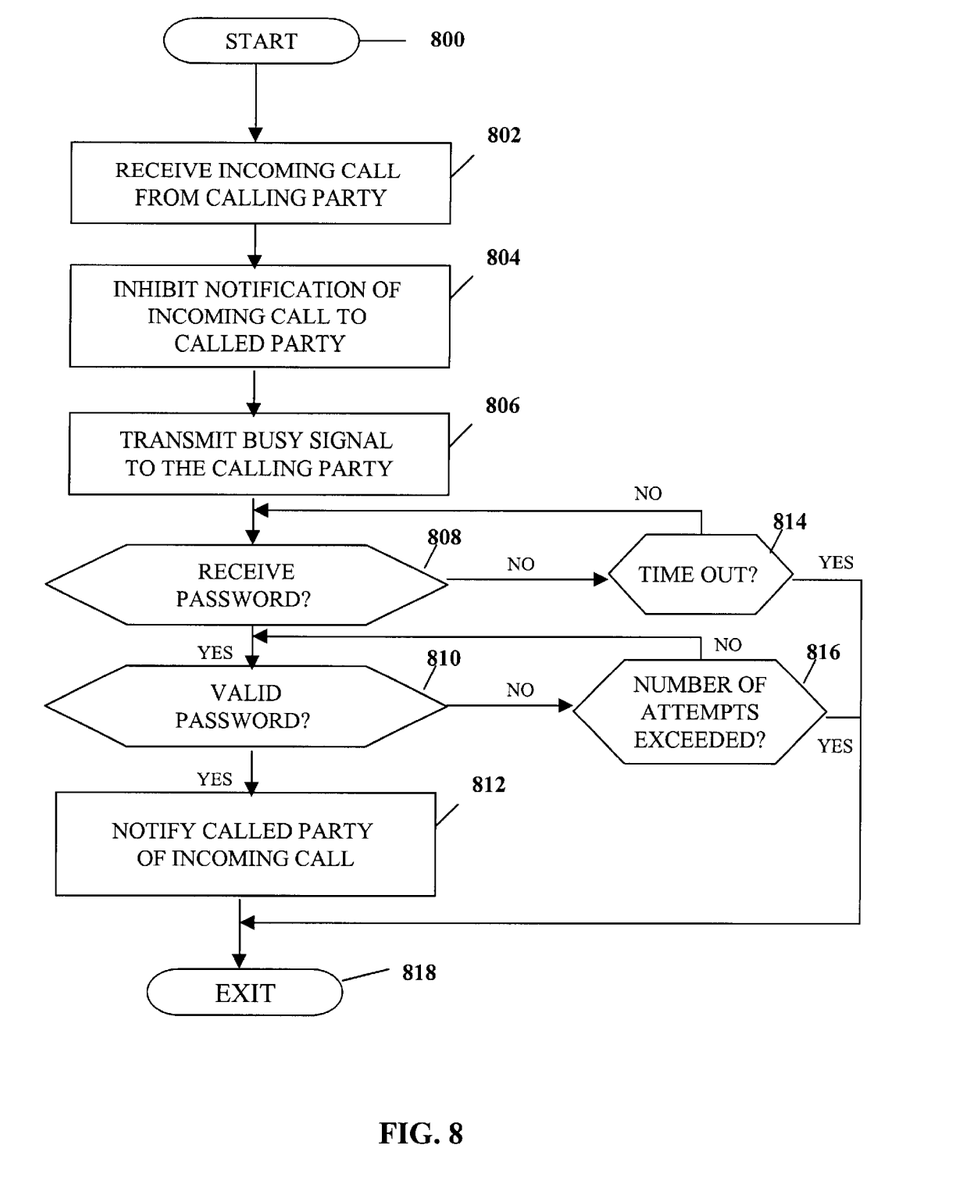
FIG. 8 is a flowchart illustrating an exemplary process by which a call station of a called party implements a selective call waiting feature in accordance with another embodiment.

FIG. 8 is a flowchart illustrating an exemplary process by which a call station of a called party implements a selective call waiting feature in accordance with another embodiment. The called station is configured to inhibit notification of an incoming call based, for example, on a user command. An example of this embodiment of the selective call waiting process will be described below with reference to the communications system shown in FIG. 1 in which a call is placed from calling party CP3 at call station 122 to the called party CP1 at call station 118.

Call station 118 initiates the process at block 800 upon receipt of an incoming call from a calling party, e.g., calling party CP3 at call station 122, at block 802. Call station 118 inhibits notification of the incoming call to the called party, e.g., called party CP1 at call station 118 at block 804. This may involve, for example, inhibiting and preventing the call station 118 from ringing, or performing notification (e.g., audio, visual, etc. notification) in general of an incoming call.

At block 806, after a communication link has been established between the call stations 118, 122, call station 118 transmits a signal simulating a busy signal. The transmitted signal is preferably a conventional busy signal to simulate the appearance that the called party is busy on another call. The busy signal or a pattern of the busy signal may be stored locally in call station 118 and outputted as audio to call station 122 of calling party CP3, accordingly.

At blocks 808 and 814, call station 118 determines whether the calling party CP3 has provided any input within a predetermined period. If the calling party has not provided any input within the predetermined period, the call is timed out with the process terminating at block 818. The call may be terminated by sending an ON hook signal to the network.

If the calling party CP3 has provided input within the predetermined period, call station 118 determines whether the calling party CP3 has entered a valid pass code at block 810, e.g., the input corresponds to a predefined pass code such as discussed above in regards to FIGS. 4A and 4B. If the pass code is valid, call station 118 notifies the called party of the incoming call at block 812, with the process terminating at block 818.

If the password is invalid, call station 118 determines whether a number of password entry attempts has been exceeded preferably within a predetermined time period at block 816. If not, call station 118 checks additional password entr(ies) at block 810. Otherwise, the process is terminated at block 818.

While the selective call waiting process is discussed above in the context of a call station, this process may also be implemented in other locations, such as at a intra/inter-switch, a central office (CO), private branch exchange (PBX), a server connected to the network, a server manager accessible by a thin host, and so forth.

The many features and advantages of the present invention are apparent from the detailed specification, and thus, it is intended by the appended claims to cover all such features and advantages of the invention which fall within the true scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A method of processing a call from a calling party to a called party, comprising:

determining whether a called party is busy on another call;

receiving a pass code from the calling party;

enabling provision of a call waiting signal to the called party if the pass code corresponds to at least one predefined pass code associated with the called party; and terminating the call if the pass code does not correspond to the at least one predefined pass code within a predetermined period of time.

2. The method according to claim 1, further comprising determining whether the pass code from the calling party corresponds to at least one predefined pass code associated with the called party.

3. The method according to claim 1, wherein the called party and calling party are connected across at least one network selected from the group consisting of a public switched network, a local switched network, internet protocol network, converged voice and data network.

4. The method according to claim 1, wherein the determining, the receiving and the enabling are performed at a location selected from the group consisting of a call station of the called party, a intra-switch associated with the called party, a inter-switch, a central office and a private branch exchange.

5. The method according to claim 1, wherein the predefined pass code is stored at an intra-switch associated with the called party.

6. The method according to claim 1, further comprising enabling the called party to define at least one pass code.

7. An apparatus for processing a call from a calling party to a called party, comprising:

means for determining whether a called party is busy on another call;

means for receiving a pass code from the calling party;

means for enabling provision of a call waiting signal to the called party if the pass code corresponds to at least one predefined pass code associated with the called party; and means for terminating the call after (1) a predetermined period of time and the calling party has not entered a predefined pass code or (2) a maximum number of invalid pass code entries have been attempted.

8. The apparatus according to claim 7, further comprising means for determining whether the pass code from the calling party corresponds to at least one predefined pass code associated with the called party.

9. The apparatus according to claim 7, wherein the called party and calling party are connected across at least one network selected from the group consisting of a public switched network, a local switched network, internet protocol network, converged voice and data network.

10. The apparatus according to claim 7, wherein the means for determining, means for receiving and the means for enabling are performed at a location selected from the group consisting of a call station of the called party, a intra-switch associated with the called party, a inter-switch, a central office and a private branch exchange.

11. The apparatus according to claim 7, wherein the predefined pass code is stored at an intra-switch associated with the called party.

12. The apparatus according to claim 7, further comprising means for enabling the called party to define the at least one pass code.

13. An apparatus for processing a call from a calling party to a called party, comprising:

processor for determining whether a called party is busy on another call, receiving a pass code from the calling party, and enabling provision of a call waiting signal to the called party if the pass code corresponds to at least one predefined pass code associated with the called party wherein the pass code maybe spoken and identified using voice recognition for authentication, said processor terminating the call after (1) a predetermined period of time and the calling party has not entered a predefined pass code or (2) a maximum number of invalid pass code entries have been attempted.

14. The apparatus according to claim 13, wherein the processor determines whether the pass code from the calling party corresponds to at least one predefined pass code associated with the called party.

15. The apparatus according to claim 13, wherein the called party and calling party are connected across at least one network selected from the group consisting of a public switched network, a local switched network, internet protocol network, converged voice and data network.

16. The apparatus according to claim 13, wherein the predefined pass code is stored at an intra-switch associated with the called party.

17. The apparatus according to claim 13, further comprising means for enabling the called party to define the at least one pass code.

18. A method of notifying a called party of an incoming call comprising:

receiving a pass code from a calling party associated with an incoming call directed to a called party wherein the pass code maybe spoken and identified using voice recognition for authentication;

notifying the called party of the incoming call only if the pass code corresponds to a predefined pass code associated with the called party; and terminating the call after (1) a predetermined period of time and the calling party has not entered a predefined pass code or (2) a maximum number of invalid pass code entries have been attempted.

19. The method according to claim 18, further comprising:

transmitting a busy signal to the calling party responsive to detection of the incoming call prior to receiving the password from the calling party.

20. The method according to claim 19, further comprising:

receiving an instruction from the called party to transmit a busy signal in the event any incoming call is detected.

21. A method of notifying a called party of an incoming call from a calling party, comprising:

inhibiting notification of the incoming call to the called party;

transmitting to the calling party a signal simulating that the called party is busy on another call, even though the called party is not busy on another call;

receiving a pass code from the calling party wherein the pass code maybe spoken and identified using voice recognition for authentication;

terminating the call after (1) a predetermined period of time and the calling party has not entered a predefined pass code or (2) a maximum number of invalid pass code entries have been attempted; and notifying the called party of the incoming call if the pass code corresponds to at least one predefined pass code associated with the called party.

22. A method of processing a call from a calling party to a called party, comprising:

receiving a request from a calling party to connect with a called party;

determining whether a called party is busy;

entering a pass code by the calling party wherein the pass code maybe spoken and identified using voice recognition for authentication;

determining whether the pass code corresponds to at least one predefined password associated with the called party is valid;

permitting additional pass code entry attempts if the pass code is invalid;

implementing call waiting if the pass code is valid; and terminating the call if the pass code is invalid.

23. The method of claim 22 further comprising:

providing a maximum number of pass code entry attempts.

24. The method of claim 22 further comprising:

terminating the call if the additional pass code entry attempts exceed a threshold.

25. The method of claim 22 further comprising:

terminating the call if the calling party does not enter a pass code within a predetermined period.

26. A method of inhibiting notification of an incoming call to a called party, comprising:

receiving an incoming call from a calling party and inhibiting notification to the called party;

transmitting to the calling party a signal simulating that the called party is busy on another call, even though the called party may not be busy on another call;

receiving a pass code from the calling party wherein the pass code maybe typed, spoken or any format that can be detected and identified for use in authentication;

terminating the call if the pass code is not received within a predetermined period;

providing additional pass code entries if the pass code is invalid;

terminating the call after a maximum number of invalid pass code entries have been attempted; and notifying the called party of the incoming call if the pass code corresponds to at least one predefined pass code associated with the called party.

* * * * *

UNITED STATES PATENT AND TRADEMARK OFFICE
CERTIFICATE OF CORRECTION

PATENT NO. : 6,813,347 B2
DATED : November 2, 2004
INVENTOR(S) : Baals et al.

It is certified that error appears in the above-identified patent and that said Letters Patent is hereby corrected as shown below:

Columns 7-8,
Line 62, "call", should read, -- call in a selective call waiting system --;

Columns 8-9,
Line 27, "another call" should read, -- another call in a selective call waiting system; --
Line 63, "party," should read, -- party in a selective call waiting system; --
Line 66, "code maybe spoken" should read, -- code is spoken --;

Columns 9-10,
Line 23, "called party wherein" should read, -- called party in a selective call waiting system wherein --;
Lines 24 and 51, "code maybe spoken" should read, -- code is spoken --;
Line 46, "party" should read, -- party in a selective call waiting system --;
Lines 48-49, "even though the called party is not busy on another call" should be deleted;

Column 10,
Line 10, "party" should read, -- party in a selective call waiting system --,
Lines 13 and 42, "code maybe spoken" should read, -- code is spoken --;
Line 36, "party and" should read, -- party in a selective call waiting system and --,
Lines 39-40, "even though the called party may not be busy on another call" should be deleted, Signed and Sealed this Twenty-eighth Day of June, 2005

JON W. DUDAS
*Director of the United States Patent and Trademark Office*